US011873196B2

(12) United States Patent
Nessler (10) Patent No.: US 11,873,196 B2
(45) Date of Patent: Jan. 16, 2024

(54) MOBILE CRANE HAVING A FOLDING WALKING PLATFORM

(71) Applicant: Liebherr-Werk Nenzing GmbH, Nenzing (AT)

(72) Inventor: Wolfgang Nessler, Braz (AT)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 68 days.

(21) Appl. No.: 17/452,911

(22) Filed: Oct. 29, 2021

(65) Prior Publication Data

US 2022/0144597 A1 May 12, 2022

(30) Foreign Application Priority Data

Nov. 6, 2020 (DE) ...................... 20 2020 106 371.5

(51) Int. Cl.
*B60R 3/00* (2006.01)
*B66C 13/54* (2006.01)

(52) U.S. Cl.
CPC .............. *B66C 13/54* (2013.01); *B60R 3/005* (2013.01)

(58) Field of Classification Search
CPC ........... B60R 3/005; B60R 3/00; B60R 3/007; B60R 3/02
See application file for complete search history.

(56) References Cited

U.S. PATENT DOCUMENTS

| | | | | | |
|---|---|---|---|---|---|
| 3,912,298 | A | * | 10/1975 | Humphrey | B60R 3/02 182/115 |
| 4,067,588 | A | * | 1/1978 | Morge | B60R 3/00 280/163 |
| 5,046,582 | A | * | 9/1991 | Albrecht | B60R 3/02 182/127 |
| 6,068,277 | A | * | 5/2000 | Magnussen | B60R 3/02 182/127 |
| 2008/0122211 | A1 | * | 5/2008 | Kang | B60R 3/005 280/762 |
| 2008/0253875 | A1 | * | 10/2008 | Yamamoto | B66C 23/74 414/719 |
| 2011/0233954 | A1 | * | 9/2011 | Micheli | B62D 33/03 296/62 |
| 2013/0187354 | A1 | * | 7/2013 | Venkataraman | B60R 3/005 280/166 |
| 2020/0399099 | A1 | * | 12/2020 | Tanimoto | E06C 7/48 |

FOREIGN PATENT DOCUMENTS

| | | |
|---|---|---|
| CN | 203925307 U | 11/2014 |
| DE | 130365 A1 | 3/1978 |
| DE | 202013003459 U1 | 7/2014 |
| DE | 102015007562 B4 | 1/2020 |

(Continued)

*Primary Examiner* — Frank B Vanaman
(74) *Attorney, Agent, or Firm* — McCoy Russell LLP (57) ABSTRACT

A mobile crane, such as a crawler crane, including an undercarriage having a chassis and a superstructure rotatably supported on the undercarriage and having a pivotable boom. At least two platforms are permanently arranged at the superstructure via which the superstructure is walkable. The platforms each comprise a base and a railing that are movable from a transport position in which they contact the superstructure into a work position in which the bases are walkable and are secured by the railings, and vice versa.

18 Claims, 9 Drawing Sheets

(56) References Cited

FOREIGN PATENT DOCUMENTS

| EP | 2216238 | B1 | | 10/2011 | | |
|----|---------|----|---|---------|---|---|
| EP | 2712966 | A1 | | 4/2014 | | |
| EP | 3135824 | A1 | | 3/2017 | | |
| JP | 07189294 | A | * | 7/1995 | ............ | E02F 9/0833 |
| JP | 2016069946 | A | | 5/2016 | | |
| JP | 2016113229 | A | * | 6/2016 | ............ | B66C 23/74 |

* cited by examiner

MOBILE CRANE HAVING A FOLDING WALKING PLATFORM

CROSS-REFERENCE TO RELATED APPLICATIONS

The present application claims priority to German Utility Model Patent Application No. 20 2020 106 371.5 filed on Nov. 6, 2020. The entire contents of the above-listed application is hereby incorporated by reference for all purposes.

TECHNICAL FIELD

The present disclosure relates to a mobile crane, such as a crawler crane.

BACKGROUND

Travelable cranes or mobile cranes are typically used when no stationary cranes are available at the deployment site or if the stationary cranes cannot be used for other reasons or can only be used with an increased effort. Mobile cranes can have an undercarriage having a wheeled chassis or a crawler chassis and as a rule have a superstructure that is rotatably supported on the undercarriage and to which a luffable main boom is connected in an articulated manner. An operator's cabin for operating the crane is furthermore typically located in the front region at the superstructure and superstructure ballast is located in the rear region.

SUMMARY

Larger mobile cranes have to be dismantled into smaller transport units for transport to the deployment site. To be able safely to set up such a mobile crane, such as a crawler crane, standardized access to the operator's cabin and to the technical systems to be installed is necessary. This often presents the operators or the setup team with complex challenges with respect to the attachment and removal of access systems. These access systems, which are, for example, access steps, walkways, stages, or platforms for lateral walking platforms, frequently have to be attached to the mobile crane in a complex manner using auxiliary cranes and/or a plurality of persons. A lateral pushing under of platforms is not possible due to the stable construction of modern superstructures. A removal of railings and platforms is in contrast complicated and typically requires a plurality of persons and/or aids.

It is therefore the object of the present disclosure to provide an access system for a mobile crane that is simple to install. The attachment and removal of the components of the access system should here be able to be carried out fast and without external aids.

A mobile crane, such as a crawler crane, is accordingly proposed that comprises an undercarriage having a chassis and a superstructure rotatably supported on the undercarriage and having a pivotable boom. At least two platforms are provided at the superstructure via which the superstructure can be walked on by operators. The platforms are here permanently arranged at the superstructure, i.e. they always remain at the superstructure and are not removed for transport.

In accordance with the disclosure, the at least two platforms each comprise a base and a railing that are movable from a transport position into a work position and vice versa. In the transport position, the platforms or the base and railings of the platforms contact the superstructure and therefore adopt a space-saving position suitable for transport. In the work position, the platforms can be walked on by operators and are secured by the railings. This means that in the work position, the bases are oriented such that they can be walked on and persons walking on the platforms are secured from falling by the railings.

Since the platforms together with the railings remain at the superstructure and can be moved from a folded or "docked" position into a work position enabling access to the superstructure, a complex and time-consuming setup and removal is dispensed with. The platforms here may be configured and arranged such that they can be installed or moved into the work position from the ground by a single person without an auxiliary crane or the like. The railings do not have to be separately attached to the platforms. In some embodiments, the installation or the removal may be possible without additional manual tools. A more comfortable, faster, and simpler setup and removal process of the mobile crane thus results overall.

Provision is made in a possible embodiment that the platforms are pivotable about at least two pivot axes into the work position, with two of the at least two pivot axes not being in parallel with one another. The platforms are therefore not brought into the work position by a simple unfolding about a single, for example horizontal, axis, but an installation procedure composed of a plurality of individual movements rather takes place. These individual movements can be able to be carried out simultaneously or successively.

Provision is made in a further possible embodiment that the bases are pivotable into the work position about two non-parallel pivot axes, for instance two pivot axes perpendicular to one another, and that the railings may be pivotable, foldable, displaceable, and/or telescopable into the work position. The movement routine for the base therefore differs from the movement routine for the railing on the moving of the platform from the transport position into the work position and vice versa.

Provision is made in a further possible embodiment that the bases and the railings of the platforms may be movable independently of one another. The bases or railings may furthermore be connectable to the bases or railings of adjacent platforms independently of one another.

Provision is made in a further possible embodiment that the platforms may be releasably connectable to one another in their work positions. A stable and continuous walkway thereby results as the superstructure walking platform that ensures a greater tread safety for the operator in comparison with known walking platforms that e.g. comprise a plurality of platforms spaced apart from one another, i.e. separated from one another by gaps.

The platforms or portions of the platforms may be hooked into one another and/or pinned to one another and/or screwed to one another in their work positions. Hook-in connections here produce a comfortable connection of the platforms that can be established without any additional tools.

Provision may be made that the connections of the platforms are reversibly lockable, for example by means of a pin or latch connection. An unwanted release of the connections of the platforms is thereby prevented.

Provision is made in a further possible embodiment that the bases comprise hook elements via which they may be hooked to base fastening elements of adjacent platforms in the work position. The bases can be pivotable about a horizontal axis, with the hook elements for establishing the hook-in connection being arranged at the side disposed opposite the pivot axis. A simple design results in that the hook elements of a platform are place or hooked at the pivot axis of the adjacent platform, with the openings of the hook elements facing downward in the work position and lying at the pivot axis.

The horizontal pivot axes of the platforms therefore represent the aforesaid base fastening elements. They may be pivoted about a vertical pivot axis on the movement of the platforms from the transport position into the work position.

Provision can alternatively or additionally be made that one or more platforms may be hooked onto base fastening elements arranged at the superstructure. They can here, for example, be platforms that are arranged at the ends or in kink or curve regions of the walking platform. These platforms are hooked directly onto the superstructure.

The hook-in connections may be reversibly locked via locking elements to prevent an unwanted release of the hook-in connections.

Provision is made in a further possible embodiment that the railings are pivotable, foldable, displaceable, and/or telescopic and are connected to adjacent railings via railing fastening elements or directly to the superstructure. It can be here that a hook-in connection that may be reversibly lockable.

The railings of each platform may comprise a plurality of struts connected to one another in an articulated manner. The railings may be moved into the work position and connected to one another by pivoting or unfolding and/or telescoping one or more parts. The railings of one or more platforms can alternatively or additionally be connectable directly to the superstructure or to railing fastening elements attached thereto. They may here, for example, be platforms that are arranged at the ends or in kink or curve regions of the walking platform.

The railings may comprise folding parts that can, for example, be configured as individual pivotable struts or as a parallelogram guides.

Provision is made in a further possible embodiment that the superstructure comprises an operator's cabin in whose area at least one further platform is arranged, with the at least three platforms forming a continuous superstructure walking platform along one side of the superstructure in the work position. The operator's cabin may thereby be comfortably reached via the walkway connection or walking platform formed by the platforms in accordance with the disclosure. In some aspects, the superstructure walking platform may extend from the rear region of the superstructure up to the operator's cabin.

Provision is made in a further possible embodiment that the access or climb to the superstructure walking platform takes place in the region of the rear of the superstructure disposed opposite the operator's cabin. Access is therefore not at the front in the area of the operator's cabin as with many customary access systems.

Provision is made in a further possible embodiment that an access element having a base and at least one railing is attachable to the superstructure such that a superstructure walking platform formed by the platforms located in the work position is accessible or walkable via the access element. The access element may be fastenable to one of the folding platforms, directly to the superstructure, or to both. In this respect, the railing of the access element may be connectable to a railing of one of the platforms and/or directly to the superstructure. This may likewise apply to the base of the access element.

Provision is made in a further possible embodiment that the access element comprises access steps that may be pivotable or fastening elements for fastening access steps.

The walking platform formed by the platforms at a certain height at the superstructure can thereby be reached or walked on. The access steps may also be a ladder.

Provision is made in a further possible embodiment that the superstructure has superstructure ballast that may be raised from the ground and placed on the ground via a lifting mechanism of the mobile crane. The lifting mechanism may be a self-loading system of the mobile crane. The access element is fastened or fastenable to the superstructure ballast, such as to a ballast receiving plate of the superstructure ballast.

The access element may be moved to the height of the superstructure walking platform by raising the superstructure ballast by means of the lifting mechanism. The access element may thus, for example, be fastened, or hooked, to the superstructure ballast comfortably from the ground and may subsequently be raised to the corresponding height so that it can be connected to the superstructure walking platform. The use of externa lifting equipment may thereby be dispensed with. The self-loading system of the superstructure ballast positions the access element, for example, automatically, on the correct walking platform level.

Provision may be made that the access element can be hooked into/onto corresponding fastening elements that are arranged, for example, at the ballast receiving plate or at a ballast element of the superstructure ballast.

Provision is made in a further possible embodiment that the access element is pivotably supported or supportable at the superstructure ballast, with the access element being connectable by pivoting with the superstructure walking platform, for example with a platform of the superstructure walking platform, after it has been raised above the superstructure ballast or by means of the lifting mechanism. Alternatively or additionally, the access element can be directly connectable to a fastening element arranged at the superstructure by pivoting. The rotation of the access element can be carried out in a simple manner by an operator from the ground. A reversible locking of the access element at the walking platform or at the superstructure may also be provided here.

Provision is made in a further possible embodiment that the upper side of the superstructure is accessible or walkable and that a superstructure railing is provided at the upper side of the superstructure, for instance, at the margin. Access to the upper side of the superstructure may take place, starting from the superstructure walking platform formed by the platforms in accordance with the disclosure, via an access ladder or via access steps, for example. The operator may thereby climb onto the upper side of the superstructure and can reach the technical systems or other crane components.

Provision is made in a further possible embodiment that at least one base element is displaceably, foldably, or pivotably supported at the upper side of the superstructure, with a walkable region being formed at the upper side of the superstructure by a plurality of such base elements. The walkable region may be flexibly adapted by the displaceability or pivotability of the base elements.

The base elements may be self-supporting and may be produced in lightweight construction, for example as a lattice. They may be attached or attachable to a base frame of the superstructure and/or to fastening elements arranged thereon. Base elements having different shapes, for example having different widths and/or lengths, can be provided. The base elements can furthermore, like the bases of the platforms, have hook elements via which they can be hooked to or placed on corresponding fastening elements of the superstructure.

It is furthermore conceivable that the superstructure comprises at least two platforms in accordance with the disclosure on each side, that is it has a superstructure walking platform at each side. One of the two superstructure walking platforms or walkway connections can be longer and can reach up to the operator's cabin.

The bases of the platforms and/or the base of the access module can be produced in lightweight construction. A simpler handling or installation of the platforms by the operator thereby results. The bases can be formed as lattices.

It is furthermore possible that the platforms are of modular design or are part of a modular access system. The geometry of the superstructure walking platform can thereby be adapted to the respective units and can e.g. be expanded as desired.

BRIEF DESCRIPTION OF THE FIGURES

Further features and details of the disclosure result from the embodiments explained in the following with reference to the Figures. There are shown.

DETAILED DESCRIPTION

Figure 1:
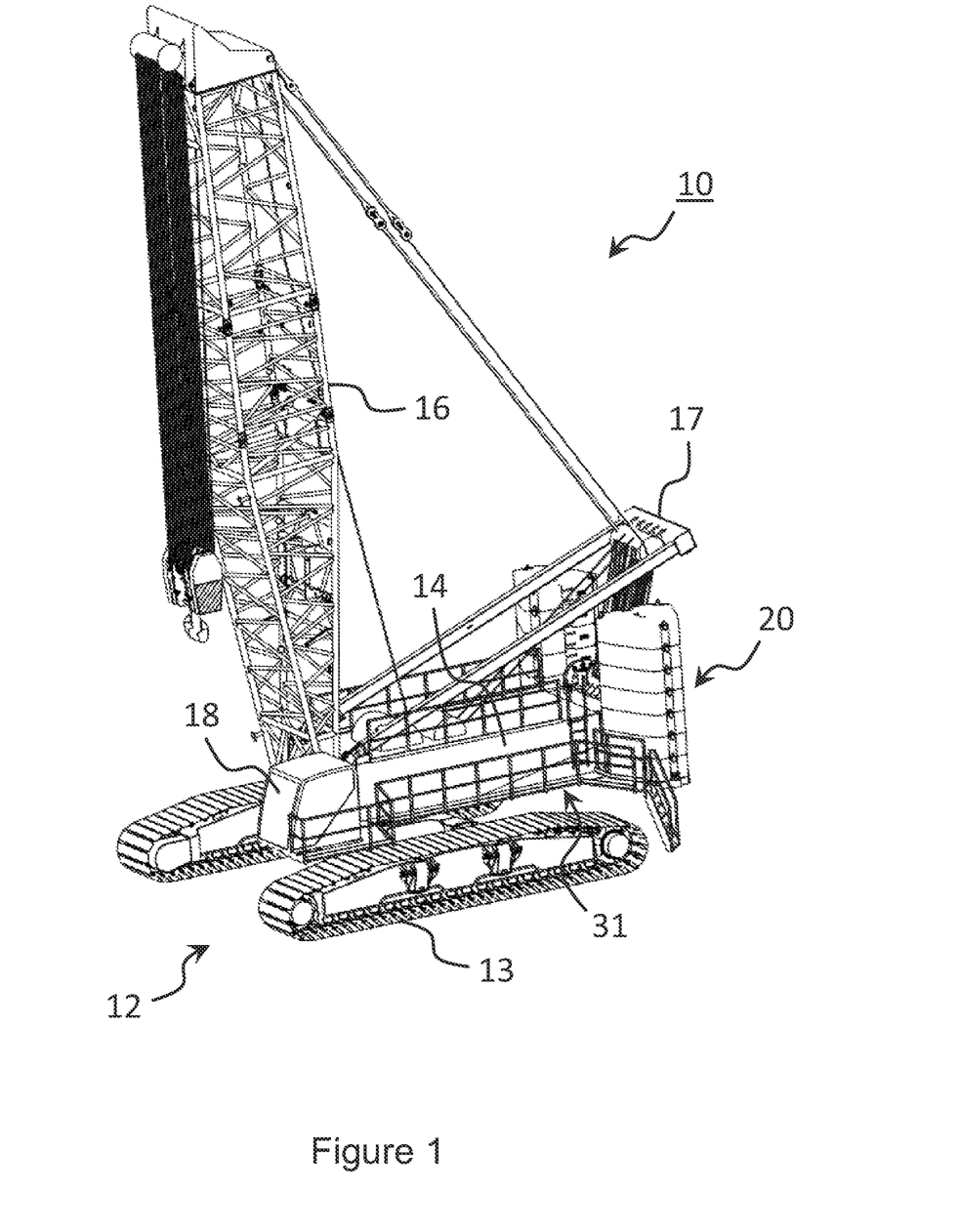
FIG. 1: the mobile crane in accordance with the disclosure in accordance with an embodiment in a perspective overall view.

FIG. 1 shows an embodiment of the mobile crane 10 in accordance with the disclosure, in a perspective overall view. The mobile crane 10 comprises an undercarriage 12 having two crawler chassis 13 and a superstructure 14 supported on the undercarriage 12 rotatable about a vertical axis.

A main boom 16 pivotable about a horizontal axis is connected in an articulated manner to the superstructure 14 in a front region (at the left in the illustration). The main boom 16 is guyed via an A frame 17 pivotably supported at the superstructure 14. An operator's cabin 18 for controlling the mobile crane 10 is likewise located in the front region of the superstructure 14. There is superstructure ballast 20 in the rear region (at the right in the illustration) that comprises a ballast receiving plate 22 and a plurality of ballast elements 24 or ballast plates stacked thereon.

A superstructure walking platform 31 in the form of a continuous walkway that can be walked on or climbed on via access steps in the region of the superstructure ballast 20 is located at the side of the superstructure 14 on which the operator's cabin 18 is located. Access to the operator's cabin supported in an elevated position is established for the operator via the superstructure walking platform 31 and access to the upper side of the superstructure 14 is established via a ladder laterally attached to the superstructure 14.

Figure 2:
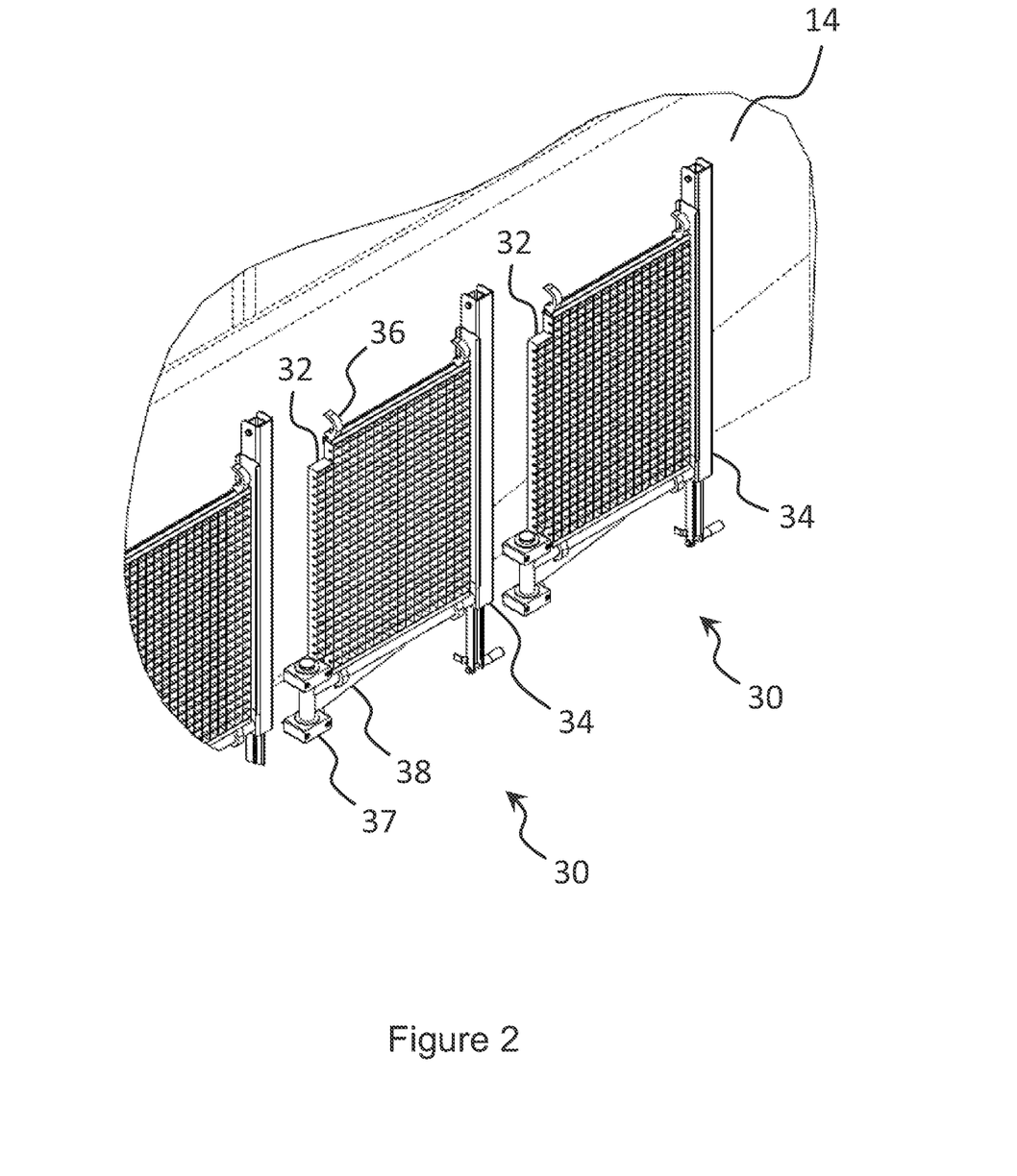
FIG. 2: a perspective representation of three platforms in accordance with the disclosure in accordance with an embodiment in the transport position.

The superstructure walking platform 31 is formed by a plurality of platforms 30 that are set up in modular form, produced in lightweight construction, and shown perspectively in different positions in accordance with an embodiment in FIGS. 2-6. The platform modules or platforms 30 are attached fixedly, i.e. permanently, to the superstructure 14 and are not removed or dismantled for transport. For transport, the platforms 30 can instead be moved into a space-saving transport position in which they laterally contact the superstructure 14 in a flat manner. This transport position is shown in FIG. 2.

The platforms 30 in accordance with the disclosure each comprise a pivotable base 32, that is designed in this embodiment as a substantially quadratic lattice, and an unfoldable railing. The platforms 30 are fixedly connected to the superstructure 14 or to a base frame of the superstructure 14 via holders 37. A locking means (not shown) can be provided for each platform 30 that fixes the platforms 30 or bases 32 in the transport position so that they do not unfold independently in an unwanted manner.

Figure 4:
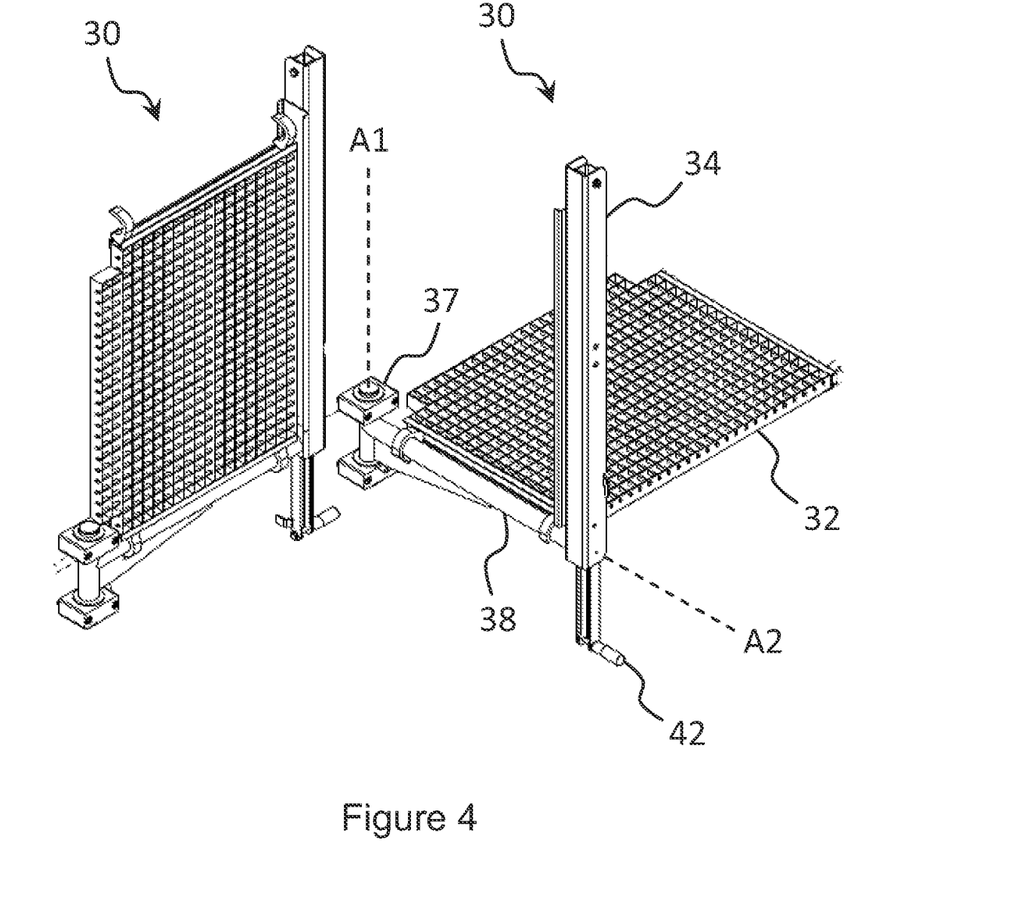
FIG. 4: the platforms in accordance with FIG. 3, with the pivoted platform being pivoted about a further axis.

A base fastening element 38 formed as a pivot console is supported pivotably about a vertical axis in each holder 37. This vertical axis form a first pivot axis A1 as is indicated in FIG. 4. The base 32 and the railing 34 of the platform 30 are in turn fastened or supported at the pivot console (base fastening element) 38.

Figure 3:
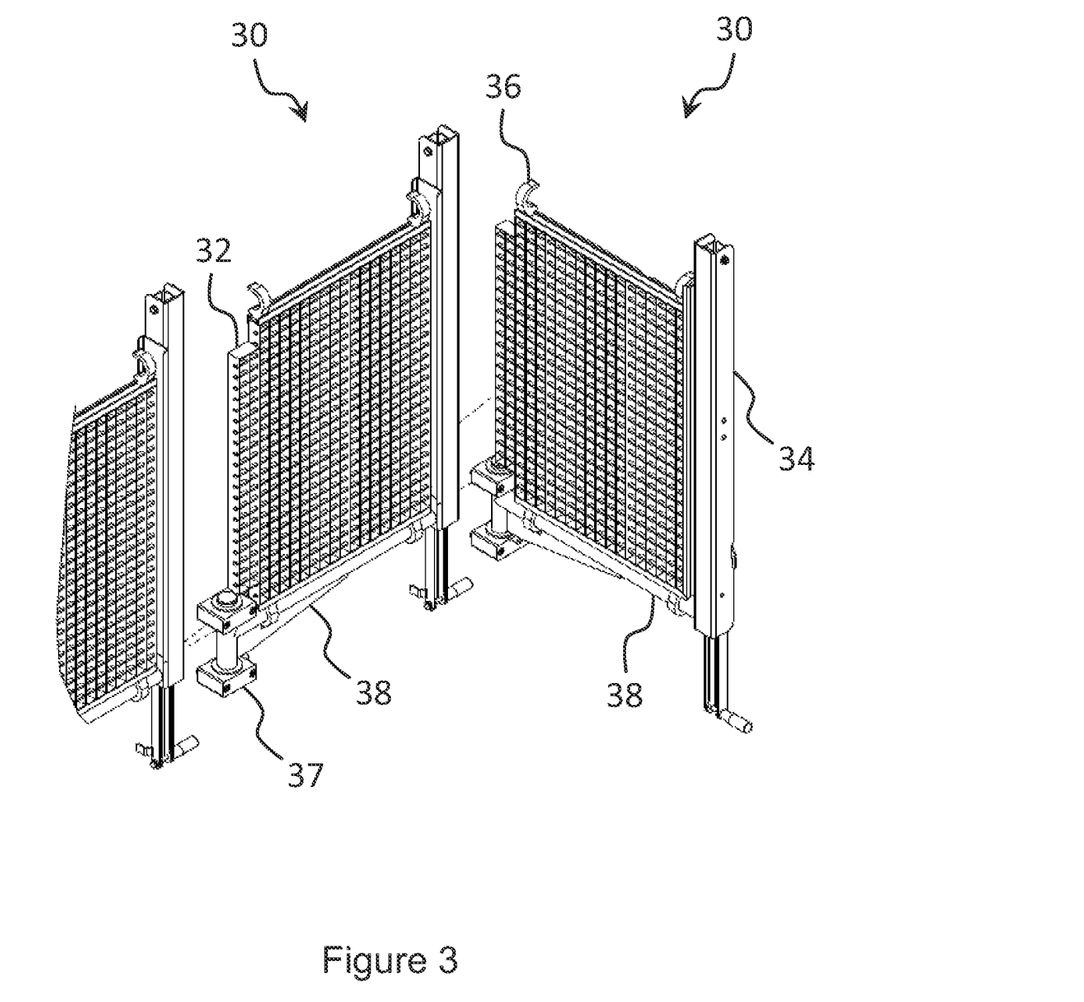
FIG. 3: the platforms in accordance with FIG. 2, with a platform being pivoted about a first axis.

As can be seen in FIG. 3, the platforms 30 can also be rotated from this transport position by (at least) 90° about the first pivot axis A1. An abutment can optionally be provided here that blocks a rotation beyond 90°. The individual platforms 30 can be moved or pivoted independently of one another. The base 32 and the railing 34 are pivoted together about the first pivot axis A1.

The pivot console 38 comprises a longitudinal arm that is arranged perpendicular to the pivot axis A2 and that forms a second pivot axis A2 since the base 32 is pivotably supported at the longitudinal arm of the pivot console 38. As can be seen in FIG. 4, the base 32 (but not the railing 34) can be pivoted and folded over about the longitudinal arm of the pivot console 38 or about the second pivot axis A2 so that it is horizontally oriented. The base 32 can therefore likewise be pivoted by (at least) 90° about the second pivot axis A2. The pivot axes A1 and A2 are perpendicular to one another. The second pivot axis A2 is in a horizontal plane.

The short arm of the pivot console 38 forming the first pivot axis A1 and its long arm are connected to one another by an angular element or an angular metal sheet having a stiffening effect. The pivot console 38 is rotatably supported via two bearing points via the short arm in the holder 37. Different arrangements or shapes of the supports or holders 37 are naturally also conceivable here.

Figure 5:
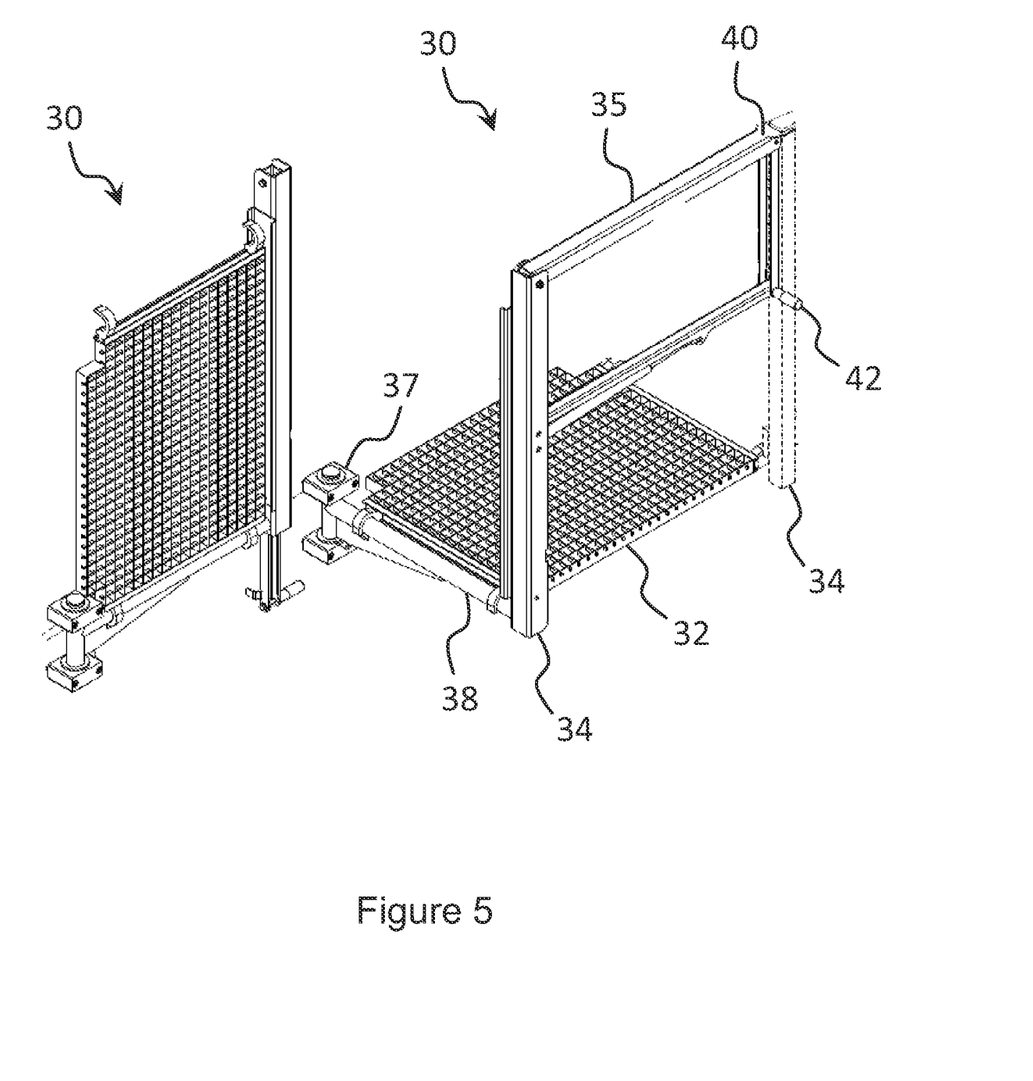
FIG. 5: the platforms in accordance with FIG. 4, with the railing of the pivoted platform being unfolded.

As shown in FIG. 5, the railing 34 of the platform 30 can be unfolded. For this purpose, the railing 34 has a vertical part that is fixedly connected to the pivot console 38 and at which a folding part 35 is pivotably supported. The folding part 35 comprises two transverse struts that are pivotably supported at the vertical railing part and that are connected in an articulated manner to a longitudinal strut at their end spaced apart from the vertical railing part. The folding part 35 thereby forms a parallelogram guide that forms a rectangle in the completely unfolded state (i.e., the transverse struts are perpendicular to the vertical railing part).

The platform 30 shown at the right in FIG. 5 is fully unfolded and is in the work position in which it can be walked on by an operator and the operated is secured against falling by the unfolded railing 34. A lever 42 that is arranged in this embodiment in the region of the articulated connection of the lower transverse strut and the longitudinal strut of the folding part 35 is provided for the easier unfolding of the folding part 35. Different positions and/or shapes of such an actuation element to facilitate the unfolding of the folding part 35 are naturally also conceivable here.

Figure 6:
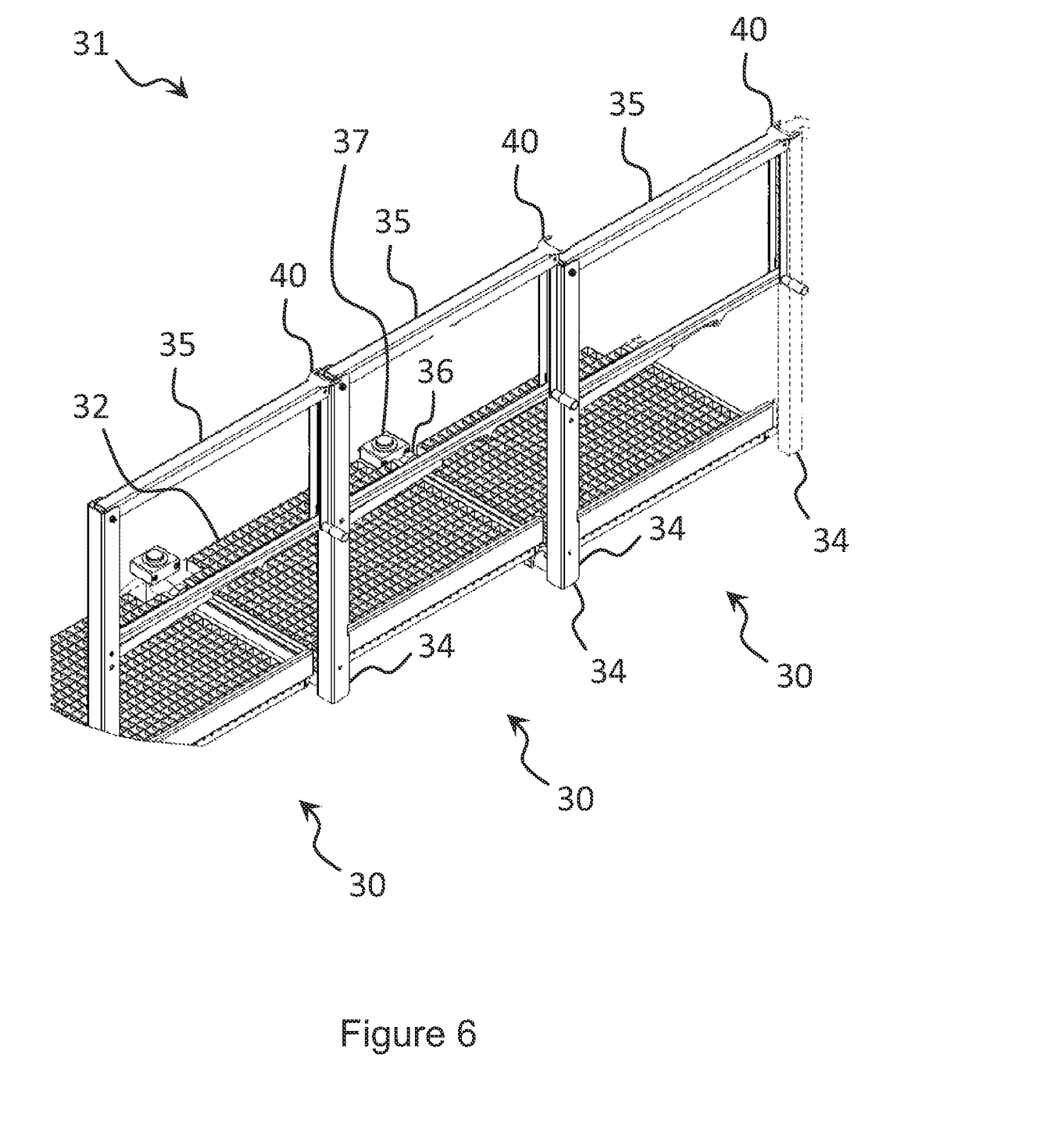
FIG. 6: the platforms in accordance with FIG. 2, with all the platforms being located in the work position.

FIG. 6 shows three platforms 30 in the work position that form a continuous walkway. The superstructure walking platform 31 is set up by a plurality of such platforms 30 that can differ in their dimensions. Some platforms 30 can thus have longer and/or angled bases 32. The superstructure walking platform 31 formed by the platforms 30 can thereby be adapted to the geometry of the superstructure 14 and can, for example, lead around one or more corners so that a continuous connection or a continuous walkway is present from the rear up to the operator's cabin 18 (cf. FIG. 1).

In comparison with many known superstructure walking platforms, the platforms 30 in accordance with the disclosure directly adjoin one another in the work position so that a gap-free continuous superstructure walking platform 31 is produced. The risk of falling or of injury is thereby minimized. The superstructure walking platform 31 can also include, in addition to the folding platforms 30 in accordance with the disclosure, fixedly installed parts, i.e. non-movable parts, such as plates/bases, railing parts, or the like rigidly attached to the superstructure 14. It is alternatively or additionally conceivable that the superstructure walking platform 31 includes one or more folding, telescopic, displaceable, or otherwise movable parts. Such parts can be provided in corner or curve regions or in the end sections of the superstructure walking platform 31.

The platforms 30 are therefore connected to adjacent platforms 30 in the work position (cf. FIG. 6). For this purpose, the bases 32 have two hook elements 36 at the sides disposed opposite the pivot consoles 38 that can be placed on or hooked into the long arms of the pivot consoles 38 on the folding over of the bases about the second pivot axes A2. The bases 32 of the adjacent platforms 30 are therefore releasably connected to one another by hook-in connections. A locking mechanism can optionally be provided here that locks the bases 32 with the adjacent platforms 30. A latch or pin connection would be conceivable here, for example.

The railings 34 of the adjacent platforms 30 are also connectable to one another in the work positions. For this purpose, the upper transverse struts of the folding parts 35 each have a railing fastening element 40 at the end disposed opposite the vertical railing part, said railing fastening element 40 being releasably connectable, such as hookable via a hook-in connection, to a corresponding fastening element at the top at the vertical part of the railing 34 of the adjacent platform 30. A reversible locking connection can also be provided here, for example by means of a latch or pin connection.

Since the platform modules 30 are designed in a lightweight construction and can be moved to and fro directly between their transport and work positions without the attachment of further parts such as railings, the installation of the superstructure walking platform 31 can take place fast and comfortably by a single operator from the ground. The superstructure walking platform 31 is adaptable or expandable as desired due to the modular construction. The platforms 30 in accordance with the disclosure can thereby be used at any desired superstructure geometries.

Figure 7:
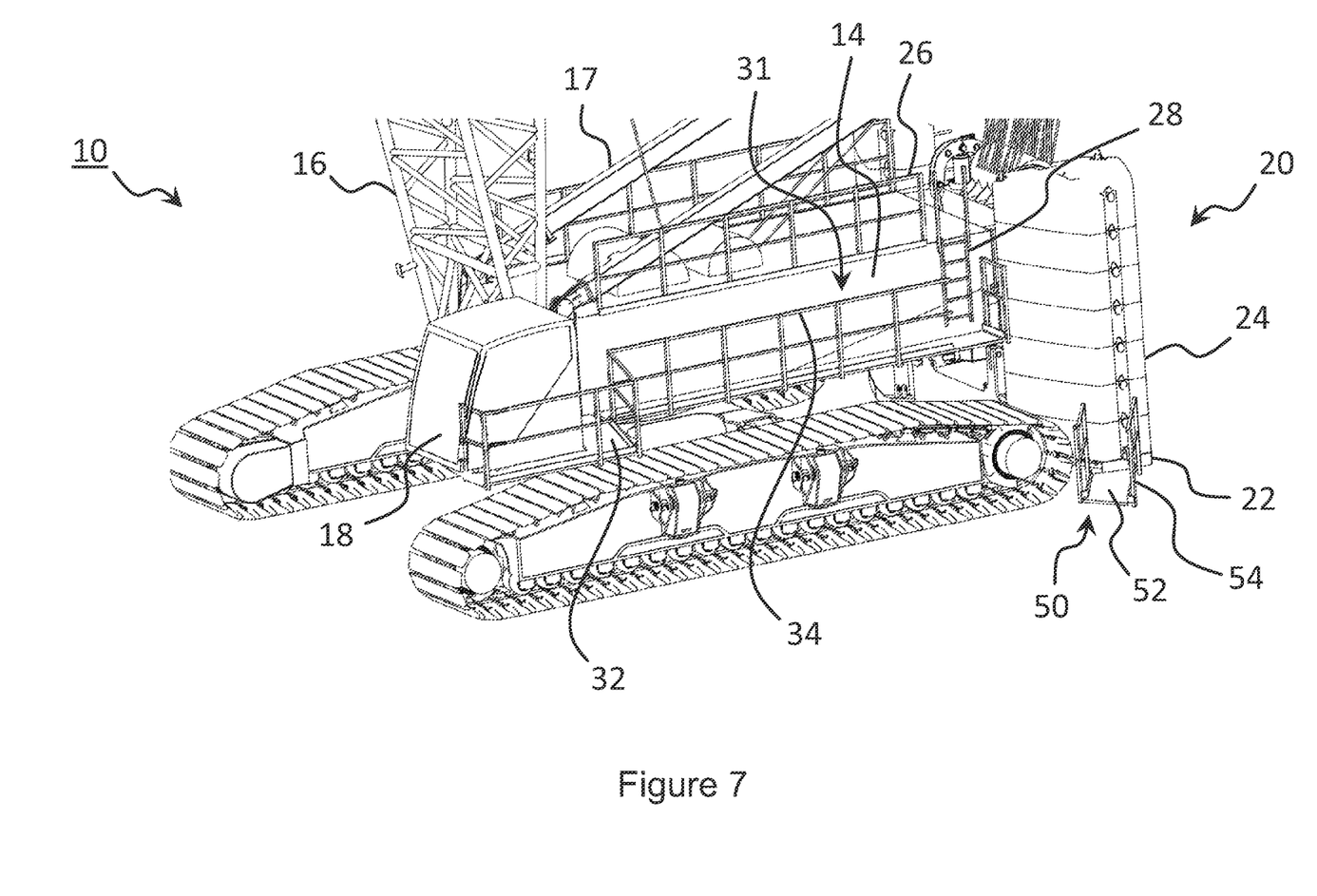
FIG. 7: an enlarged representation of the superstructure of the mobile crane in accordance with FIG. 1 with lowered superstructure ballast.

FIG. 7 shows an enlarged detail of the superstructure 14 of the mobile crane 10 in accordance with the disclosure. The superstructure ballast 20 can be raised from the ground or placed on the ground from the superstructure 14 by means of a lifting mechanism of the mobile crane 10 that can also be called a self-loading system. The ballast receiving plate 22 can thereby be loaded with ballast elements 24 on the ground and the fully equipped or stacked superstructure ballast 20 can subsequently be raised to the superstructure 14 by means of the lifting mechanism.

The lifting mechanism is also used to equip the access to the superstructure walking platform 31 in the present case. Access takes place in the rear region via an access element 50 or access module that is likewise produced in lightweight construction and that has a base 52 (for example, a lattice base) and two railings 54 at both sides. The access element 50 is pivotably fastened to the ballast receiving plate 22, such as via a hook-in connection. The assembly takes place with a lowered superstructure ballast 20 as can be seen in FIG. 7.

Figure 8:
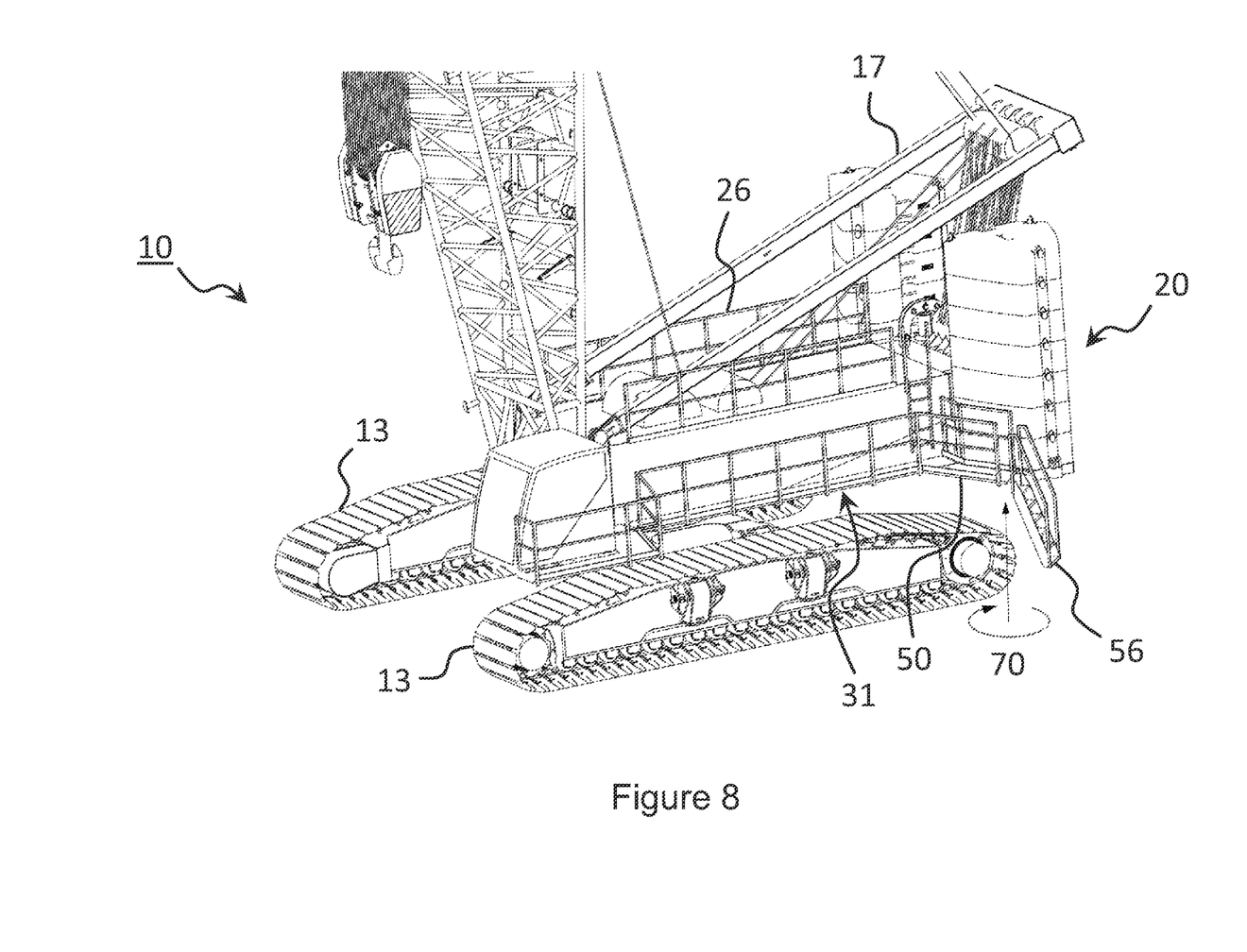
FIG. 8: the mobile crane in accordance with FIG. 7 with raised superstructure ballast and a connected access module.

The access module 50 is automatically positioned at the correct height—namely at the height of the superstructure walking platform 31—by raising the superstructure ballast 20 by means of the lifting mechanism. The superstructure walking platform 31 has a gap in the railing in the rear region to which the access element 50 is attached. This gap can e.g. be provided by a special platform 30 (for example only a folding base) or by a stage fixedly connected to the superstructure 14. As is shown in FIG. 8, the access element 50 is rotated toward the superstructure walking platform 31 (cf. the arrows 70 that indicate the directions of lifting and rotation) by an operator from the ground. A locking connection can be provided here.

Access steps 56 can now be attached, or hooked, to specific fastening elements of the access element 50 so that the elevated superstructure walking platform 31 can be climbed by an operator.

A ladder 28, such as an extendable ladder, (cf. FIG. 7) via which the upper side of the superstructure 14 can be climbed is located in the region of the (attached) access element 50. Superstructure railings 26 are attached to the margins at the upper side of the superstructure 14 for securing.

Figure 9:
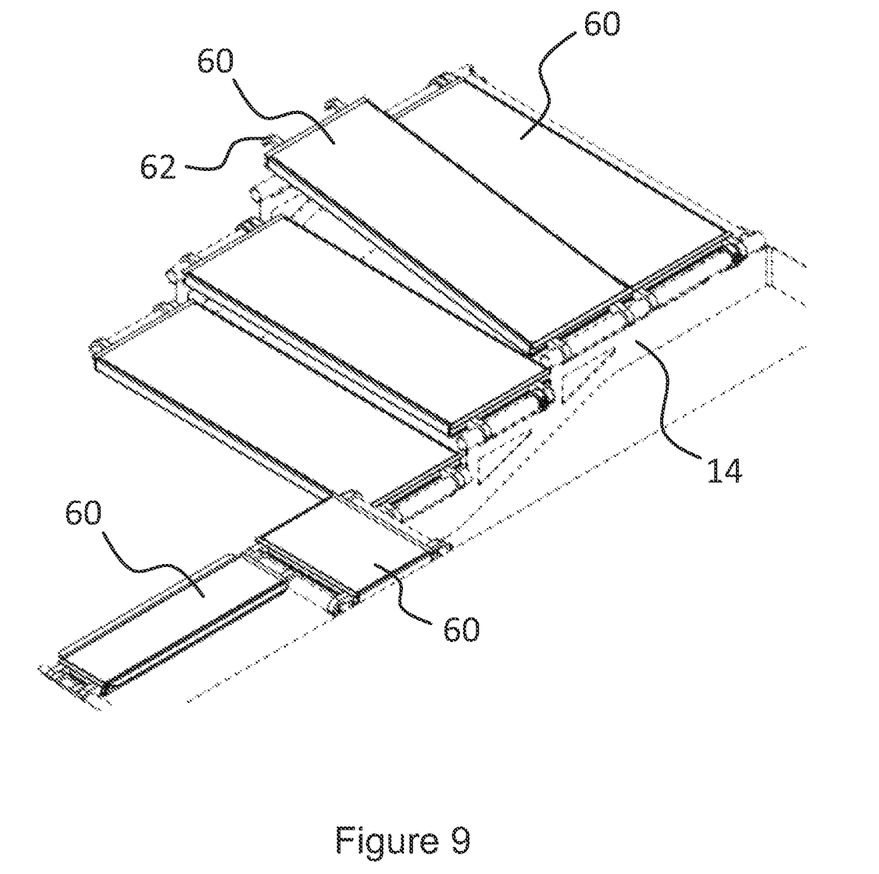
FIG. 9: a perspective view of a plurality of base plates at the upper side of the superstructure in accordance with an embodiment.

Walking on the superstructure 14 takes place via self-supporting sectional bases or base elements 60 produced in lightweight construction. An embodiment for a walkable region of the superstructure formed by such base elements 60 is shown in FIG. 9. The base elements 60 are very easily displaceable and additionally foldable on the existing base frame of the superstructure 14. For this purpose, the base elements have hook elements 62 at the side via which they lie on corresponding fastening elements at the base frame. The base elements 60 may be of different shapes, that is of different lengths and widths, and are therefore flexibly adaptable to the superstructure geometry and to the objects or obstacles installed at the upper side. Such a walkable region of sectional bases or base elements 60 cannot only be used on the superstructure, but also in other regions, for example instead of the lattice bases in the folding platforms.

The platforms 30 in accordance with the disclosure enable a fast and simple installation of the superstructure walking platform 31 without external aids such as an auxiliary crane or manual tools from the ground and by only one single operator. Although they may be metal, they are produced in lightweight construction and are thereby simple to handle.

The invention claimed is:

1. A mobile crane comprising an undercarriage having a chassis and a superstructure rotatably supported on the undercarriage and having a pivotable boom,
   wherein at least two platforms are permanently arranged laterally at the superstructure via which the superstructure is walkable,
   wherein the platforms each comprise a base and a railing that are movable from a transport position in which they contact the superstructure into a work position in which the bases are walkable and are secured by the railings, and vice versa,
   wherein the platforms form a continuous surface,
   wherein the platforms are pivotable about at least two pivot axes into the work position,
   wherein the bases are pivotable into the work position about at least two pivot axes, and
   wherein two of the at least two pivot axes are non-parallel.

2. The mobile crane in accordance with claim 1, wherein the bases and the railings of the platforms are each movable independently of one another and are each connectable independently of one another to bases and railings of adjacent platforms.

3. The mobile crane in accordance with claim 1, wherein the platforms are releasably connectable to one another in the work position.

4. The mobile crane in accordance with claim 1, wherein the railings are pivotable, foldable, displaceable, and/or telescopable and are connectable to adjacent railings and/or to the superstructure via railing fastening elements.

5. The mobile crane in accordance with claim 1, wherein the superstructure comprises an operator's cabin wherein in an area at least one further platform is arranged, with the at least three platforms forming a continuous superstructure walking platform along one side of the superstructure in the work position.

6. The mobile crane in accordance with claim 5, wherein access to the continuous superstructure walking platform takes place in a region of a rear of the superstructure disposed opposite the operator's cabin.

7. The mobile crane in accordance with claim 1, wherein an access element having a base and a railing is attachable to the superstructure such that a superstructure walking platform formed by the platforms located in the work position is accessible via the access element.

8. The mobile crane in accordance with claim 7, wherein the access element comprises access steps that are pivotable or fastening elements for fastening access steps.

9. The mobile crane in accordance with claim 7, wherein the superstructure has superstructure ballast that can be raised from the ground and placed on the ground via a lifting mechanism of the mobile crane, with the access element being fastened or fastenable to the superstructure ballast.

10. The mobile crane in accordance with claim 9, wherein the access element is pivotably supported or supportable at the superstructure ballast, with the access element raised via the superstructure ballast being connectable to the superstructure walking platform.

11. The mobile crane in accordance with claim 10, wherein the superstructure walking platform is connectable to a platform by pivoting.

12. The mobile crane according to claim 9, wherein the access element is fastened or fastenable to a ballast receiving plate of the superstructure ballast and can be moved to a height of the superstructure walking platform by raising the superstructure ballast.

13. The mobile crane in accordance with claim 1, wherein an upper side of the superstructure is walkable, and wherein a superstructure railing is provided at the upper side of the superstructure.

14. The mobile crane in accordance with claim 13, wherein at least one base element is displaceably or foldably or pivotably supported at the upper side of the superstructure.

15. The mobile crane in accordance with claim 14, wherein a walkable region of the superstructure is formed by a plurality of base elements at the upper side of the superstructure.

16. The mobile crane in accordance with claim 1, wherein the mobile crane is a crawler crane.

17. A mobile crane comprising an undercarriage having a chassis and a superstructure rotatably supported on the undercarriage and having a pivotable boom,
   wherein at least two platforms are permanently arranged laterally at the superstructure via which the superstructure is walkable,
   wherein the platforms each comprise a base and a railing that are movable from a transport position in which they contact the superstructure into a work position in which the bases are walkable and are secured by the railings, and vice versa,
   wherein the platforms form a continuous surface, and
   wherein the bases have hook elements via which they can be hooked to base fastening elements of adjacent platforms and/or to base fastening elements at the superstructure in the work position.

18. A mobile crane comprising an undercarriage having a chassis and a superstructure rotatably supported on the undercarriage and having a pivotable boom,
   wherein at least two platforms are permanently arranged laterally at the superstructure via which the superstructure is walkable,
   wherein the platforms each comprise a base and a railing that are movable from a transport position in which they contact the superstructure into a work position in which the bases are walkable and are secured by the railings, and vice versa,
   wherein the platforms form a continuous surface,
   wherein the platforms are pivotable about at least two pivot axes into the work position,
   wherein the bases are pivotable into the work position about at least two pivot axes,
   wherein two of the at least two pivot axes are non-parallel,
   wherein the two non-parallel pivot axes of the at least two pivot axes are perpendicular to one another, and
   wherein the railings are pivotable, foldable, displaceable, and/or telescopable into the work position.

* * * * *